(12) United States Patent
Shimada (10) Patent No.: US 9,595,407 B2
(45) Date of Patent: Mar. 14, 2017

(54) PUSH SWITCH

(75) Inventor: Hiroyuki Shimada, Tokyo (JP)

(73) Assignee: Valeo Japan Co., Ltd. (JP)

( * ) Notice: Subject to any disclaimer, the term of this patent is extended or adjusted under 35 U.S.C. 154(b) by 201 days.

(21) Appl. No.: 14/237,473

(22) PCT Filed: Jul. 25, 2012

(86) PCT No.: PCT/JP2012/068817
§ 371 (c)(1),
(2), (4) Date: Apr. 17, 2014

(87) PCT Pub. No.: WO2013/021820
PCT Pub. Date: Feb. 14, 2013

(65) Prior Publication Data
US 2014/0216910 A1    Aug. 7, 2014

(30) Foreign Application Priority Data

Aug. 10, 2011   (JP) .................................. 2011-175260

(51) Int. Cl.
*H01H 3/02*    (2006.01)
*H01H 13/14*   (2006.01)
(Continued)

(52) U.S. Cl.
CPC ............. *H01H 13/14* (2013.01); *B60Q 1/441* (2013.01); *H01H 1/18* (2013.01); *H01H 1/60* (2013.01);
(Continued)

(58) Field of Classification Search
CPC .......... H01H 13/14; H01H 1/18; H01H 13/20; H01H 3/001
(Continued)

(56) References Cited

U.S. PATENT DOCUMENTS 6,605,792 B2 *   8/2003   Sato ..................... H01H 1/2016
                                              200/239
7,538,290 B2 *   5/2009   Nakade .................. H01H 13/56
                                              200/344
(Continued)

FOREIGN PATENT DOCUMENTS

| JP | H05-075923 U | 10/1993 |
|----|--------------|---------|
| JP | 2004-342437 A | 12/2004 |
| JP | 2010-211976 A | 9/2010 |

OTHER PUBLICATIONS

International Search Report; Application No. PCT/JP2012/068817; Filed: Jul. 25, 2012. Completion of International Search Report: maild Oct. 9, 2012 (Form PCT/ISA/210).

*Primary Examiner* — Renee Luebke
*Assistant Examiner* — Lheiren Mae A Caroc
(74) *Attorney, Agent, or Firm* — Fishman Stewart PLLC (57) ABSTRACT

In an initial state where a push rod is pressed down, a base of a movable contact point board supporting a movable contact point makes contact with inclined protruding portions of a moving block by a second spring to be inclined. When the movable contact point makes contact with a fixed contact point following the projecting of the push rod, the base makes contact with stoppers. Thereafter, since the moving block alone rises, the movable contact point board rotates following the end edges of the stoppers according to release of the pressing by the protruding portion. Thereby the movable contact point largely slides and is displaced to the fixed contact point.

10 Claims, 6 Drawing Sheets

(51) Int. Cl.
  *B60Q 1/44* (2006.01)
  *H01H 1/18* (2006.01)
  *H01H 13/18* (2006.01)
  *H01H 3/00* (2006.01)
  *H01H 1/60* (2006.01)
  *H01H 13/20* (2006.01)

(52) U.S. Cl.
  CPC ............ *H01H 3/001* (2013.01); *H01H 13/18* (2013.01); *H01H 13/20* (2013.01)

(58) Field of Classification Search
  USPC ........................................ 200/520, 529, 341
  See application file for complete search history.

(56) References Cited

U.S. PATENT DOCUMENTS

2008/0264769 A1* 10/2008 Wong ................... H01H 1/2016
  200/400
2010/0224472 A1 9/2010 Horikoshi et al.

* cited by examiner

PUSH SWITCH

CROSS-REFERENCE TO RELATED APPLICATION

This application claims priority under 35 USC 119 from Japanese Patent Application No. 175260/2011 filed on Aug. 10, 2011, the disclosure of which is herein incorporated by reference.

BACKGROUND OF THE INVENTION

Field of the Invention

The present invention relates to a push switch that is configured to close an electrical circuit by performing a stroke movement of a movable contact point, which is arranged to be spaced from a fixed contact point, on an opposing line thereof to make contact with each other.

Description of the Related Art

For example, Japanese Patent Laid-Open Publication No. 2000-62528 discloses this kind of conventional push switches. This push switch relates to a brake switch attached to a brake pedal for a vehicle, wherein a push rod that is pushed down into a casing causes a movable contact point to be separated from a fixed contact point in a mounting state, and when a brake pedal is depressed, the push rod is in a state of being movable in an outward direction of the casing, and the movable contact point urged by a contact pressure spring moves to be in contact with the fixed contact point.

Incidentally at the operating of the push switch, the respective opposing surfaces of the contact points become closer or away in a perpendicular direction with each other. In many cases, however, abrasion powder caused by the operation is interposed between the opposing surfaces of the movable contact point and the fixed contact point or arc is generated between the contact points to accumulate carbides or oxides to form an insulating film thereon. In this case, a so-called contact failure is generated to bring in operation instability.

Therefore, in the conventional push switch as mentioned above, a contact piece is formed in a paired cantilever shape obliquely extending in a direction of being closer to the fixed contact point from the central flat plate section, and the moving contact points are provided in tip ends thereof to oppose a pair of the fixed contact points and are urged in a direction of the fixed contact points by the contact pressure spring. Therefore at the time the moving contact point makes contact with the fixed contact point, the moving contact point is configured to make elastic contact with the fixed contact point by a predetermined pressure.

In addition, at the time of the elastic contact between the contact points, the cantilever shape section in the contact piece is deflected by an urging force of the contact pressure spring, and therefore the movable contact point slides by a slight distance on the fixed contact point outwardly. Thereby a wiping operation on the contact surfaces of the contact points of each other is performed to eliminate foreign objects such as abrasion powder, carbides, oxides and the like.

In the conventional push switch as mentioned above, however, since the cantilever shaped section of the contact piece is in a free state before the elastic contact of the contact points, the contact pressure between the contact points has no other choice of starting with an initial value of zero, and as usual, it is not possible to avoid the arc generation between the contact points to be caused by a wobbly movement of the contact piece at the contacting of the contact points. In addition, a displacement of the movable contact point is caused only by a deflection of the cantilever shaped section and a sliding amount thereof is small. Therefore it is not sufficient for the effective wiping operation.

SUMMARY OF THE INVENTION

Accordingly, the present invention is made in view of the above-described problems in the conventional push switch, and an object of the present invention is to provide a push switch that can perform an effective wiping operation between a movable contact point and a fixed contact point.

According to an aspect of the present invention, a push switch in which a movable contact point moves in a predetermined axis line direction to make contact with a fixed contact point, comprises:

a moving contact point board that is provided with the movable contact point and moves along the axis line;

a moving block that moves on the axis line to be contactable with the movable contact point board;

an urging unit configured to urge the movable contact point board and the moving block in a direction of being in contact with each other;

a stopper for stopping the moving of the movable contact point board in a predetermined position where the movable contact point makes contact with the fixed contact point;

an inclining unit that is provided in at least one of the movable contact point board and the moving block to hold the movable contact point board in an inclined state to the axis line in a contacting state of each other; and a posture changing unit configured to change a posture of the movable contacting point board from the inclined state corresponding to the separation by the movement of the moving block after the stroke movement is stopped by the stopper.

According to the aspect of the present invention, since the posture of the movable contact point board that supports the movable contact point changes during a period in which the fixed contact point and the movable contact point make contact with each other, a larger sliding displacement is generated between both the contact points as compared to that by a simple deflection of a spring member that supports the movable contact point in the conventional switch, thus making it possible to obtain an excellent wiping operation.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DESCRIPTION OF THE PREFERRED EMBODIMENTS

Figure 1:
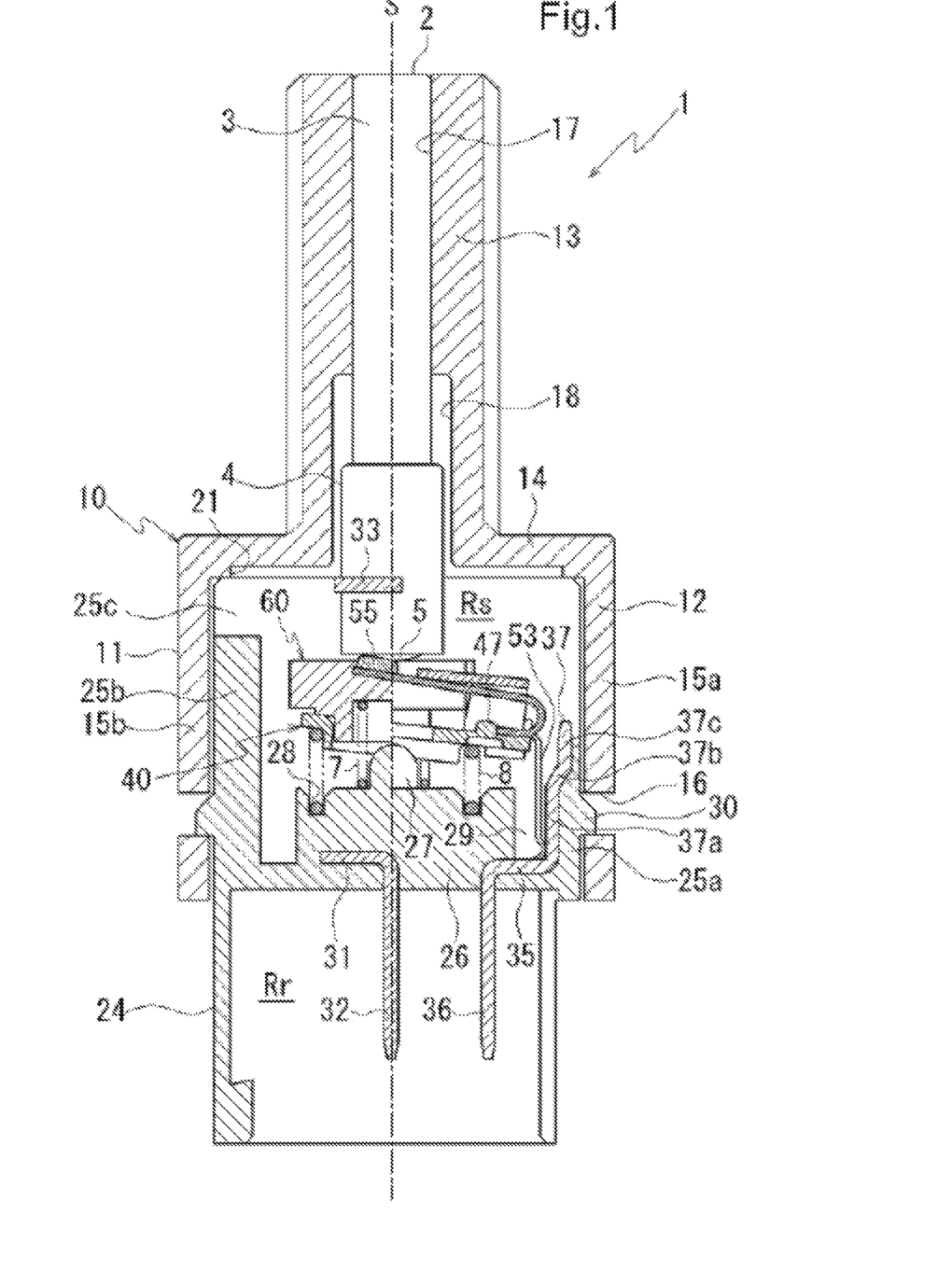
FIG. 1 is a cross section showing a push switch according to an embodiment in the present invention.

Hereinafter, a push switch according to an embodiment in the present invention will be explained with reference to the accompanying drawings. FIG. 1 is a cross section showing a push switch according to an embodiment in the present invention. FIG. 1 shows an initial state where a push rod is pressed down into a casing by a brake pedal-side member in a brake release state in a case where the push switch is applied to a brake pedal. A push switch 1 holds a push rod 2, and is configured to accommodate a movable contact point board 40 that holds a movable contact point plate 50, a moving block 60 and a fixed contact point plate 31 within a casing 10.

The casing 10 comprises a first case 11 and a second case 24, wherein the first case 11 is made of metal or resin, and primarily accommodates the push rod 2 therein, and the second case 24 is made of resin, and accommodates the movable contact point board 40 and the fixed contact point plate 31 and forms a connector portion.

It should be noted that for descriptive purposes, the present embodiment will be explained such that a first case 11-side is defined as an upward side and a second case 24-side is defined as a downward side.

The push rod 2 comprises a round shaft-shaped operation portion 3 a tip end of which is projectable from an upper end of the first case 11 to an outside, and a collar portion 4 that is formed to be coaxial with the operation portion 3 at the root (casing 10-side) and has a diameter larger than that of the operation portion 3. A lower end surface of the collar portion 4 is provided with a projection 5 having a gradual spherical surface.

It should be noted that the push switch 1 is a switch of a type that switches on by projecting the push rod 2 pressed down into the casing 10.

The first case 11 has an outside appearance of projecting a cylindrical portion 13 from an upper wall 14 of a fitting portion 12 that covers the second case 24, and a screw for a mounting nut is formed on an outer periphery of the cylindrical portion 13.

The fitting portion 12 has a substantially square shape in section, and is provided with opposing side walls 15a and 15b each having an engagement hole 16 in engagement with a click 30 provided in the second case 24. A step portion 21 is formed in the upper wall 14 of the fitting portion 12.

In the cylindrical portion 13 are formed a first hole 17 that opens at a tip end thereof and guides the operation portion 3 of the push rod 2, and a second hole 18 that is communicated with the first hole 17 to accommodate the collar portion 4 and is communicated with an inside of the fitting portion 12. The operation portion 3 is projectable from the cylindrical portion 13 until the collar portion 4 makes contact with a step portion between the first hole 17 and the second hole 18.

Figure 2:
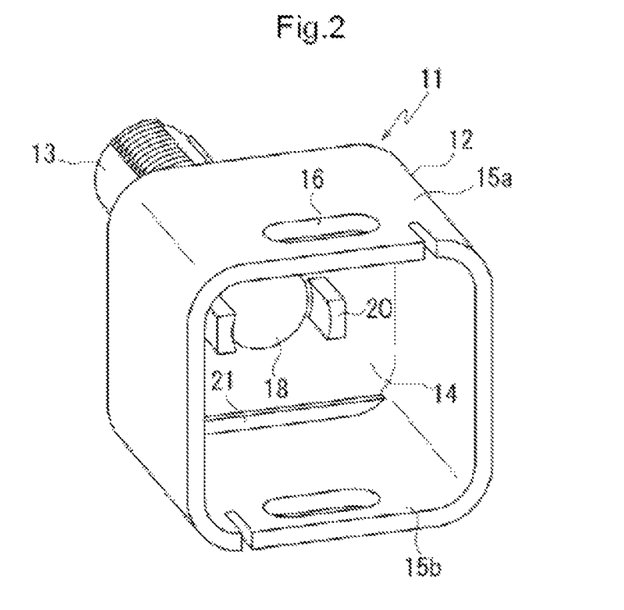
FIG. 2 is a perspective view showing a first case as viewed from a side of a fitting part according to the embodiment.

As shown in FIG. 2, the upper wall 14 of the fitting portion 12 is provided with two sheets of rib-shaped stoppers 20 that are formed thereon to have an opening of the second hole 18 therebetween and extend downward in an axial direction. The stoppers 20 are positioned on a diameter line of the second hole 18 and are set to oppose an outer peripheral upper surface 46 of a disc portion 42 to be described later.

A lining-up direction of the stoppers 20 is set in parallel with a lining-up direction of fixed contact points 33 in a contact point accommodating chamber Rs to be described later.

It should be noted that hereinafter, a center line of the push rod 2 that slides in the first hole 17 and in the second hole 18 is referred to as an axis line (or axis center) S, which is used as a reference basis for explaining positional relations of components.

Referring back to FIG. 1, the second case 24 is provided with the contact point accommodating chamber Rs that opens to the first case 11-side, and a reception concave portion Rr as the connector portion that opens at the opposite side to the first case 11.

The contact point accommodating chamber Rs has a quadrangle in transverse section, and side walls 25a and 25b thereof are provided with the clicks 30 described above.

On a bottom wall 26 in the contact point accommodating chamber Rs are provided a projection-shaped spring receiver 27 that receives one end (lower end) of a first coil spring 7, which will be described later, in a center thereof positioned on the axis line S of the push rod 2, and a ring groove-shaped spring receiver 28 that is coaxial with the spring receiver 27 to receive one end (lower end) of a second coil spring 8.

Further, the fixed contact point plate 31 is molded in the bottom wall 26. One end of the fixed contact point plate 31 extends into the reception concave portion Rr. The fixed contact point plate 31 has a tip end that is configured as a connector terminal 32 and the other end that is branched to extend into a side wall 25c in the contact point accommodating chamber Rs to the vicinity of an upper end thereof, which thereafter, bend in an approach direction with each other, and are exposed inside the contact point accommodating chamber Rs as the fixed contact points 33 surfaces of which are perpendicular to the axis line S at both sides around the axis line S of the push rod 2. In FIG. 1, only the fixed contact point 33 at one side is illustrated, and the midway route is omitted.

Further, a power supply plate 35 is molded in the bottom wall 26. The power supply plate 35 has one end that extends into the reception concave portion Rr and is configured as a connector terminal 36, and the other end that extends to an axial intermediate position in the contact point accommodating chamber Rs along an inner surface of the side wall 25a in the contact point accommodating chamber Rs and is configured as a tongue piece contact portion 37 making contact with tongue pieces 53 of the movable contact point board 40 to be described later.

For ensuring a contact range of the tongue piece contact portion 37 and the tongue piece 53, a concave portion 29 is formed in the bottom wall 26 to be recessed along an inner side surface (axis center S-side) of the tongue piece contact portion 37 to expose the inner side surface of the tongue piece contact portion 37 to an inside of the concave portion 29.

The tongue piece contact portion 37 has a lower parallel portion 37a that rises in parallel with the axis line S from the bottom wall 26, then an inclined portion 37b connected thereto, and an upper parallel portion 37c that is offset outward via the inclined portion 37b and is again in parallel with the axis line S.

It should be noted that axial positioning of the first case 11 and the second case 24 is performed by engagement between the engagement hole 16 of the first case 11 and the click 30 of the second case 24, and by contact between the step portion 21 of the first case 11 and the side wall 25c of the second case 24.

In the contact point accommodating chamber Rs, the movable contact point board 40 provided with a through hole 44 at the center is supported by the other end (upper end) of the second coil spring 8 to be urged upward, and the moving block 60 is supported by the other end (upper end) of the first coil spring 7 penetrating through the through hole 44 of the movable contact point board 40 to be urged upward.

In an initial state of the push rod 2, the tip end of the operation portion 3 is in a position in accordance with the tip end of the cylindrical portion 13 in the casing 10, and then the projection 5 of the collar portion 4 presses down the moving block 60. Thereby the movable contact point board 40 that is urged upward makes contact with the moving block 60.

Figure 3:
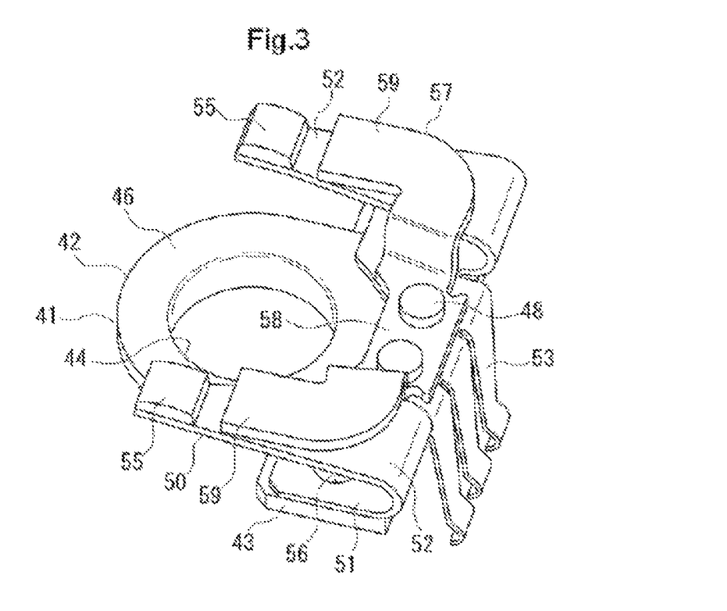
FIG. 3 is a perspective view showing a movable contact point board according to the embodiment.

FIG. 3 is a perspective view showing the movable contact point board 40.

The movable contact point board 40 is an assembly that comprises a base 41, a movable contact point plate 50, and a pressing member 57.

The base 41 is made of resin or metal, formed of a disc portion 42 as a main body, and is provided with a movable contact point plate support portion 43 formed by enlarging a part thereof outward.

The disc portion 42 has the through hole 44 at the center, and a cylindrical portion 45 (refer to FIG. 6 to be illustrated later) that projects in a flange shape downward from a hole edge of the through hole 44. A lower surface of the disc portion 42 is configured as a spring receiver that receives an upper end of the second coil spring 8 positioned by the cylindrical portion 45.

The outer peripheral upper surface 46 of the disc portion 42 is formed as a smooth plane having a predetermined radial width in regard to the center of the through hole 44, and a corner portion as a transfer portion from the outer peripheral upper surface 46 to the cylindrical portion 45 of the disc portion 42 is formed as an arc curved surface. An upper surface of the movable contact point plate support portion 43 connecting to the disc portion 42 is on the same plane with the outer peripheral upper surface 46.

A contour of the movable contact point plate support portion 43 uses a diameter line of the disc portion 42 as a two-parting line to be formed as a rectangle extending in both directions perpendicular to the two-parting line, and a side thereof in a side of the disc portion 42 virtually passes through the vicinity of the hole edge of the through hole 44. Round projections 47 for mounting the movable contact point plate 50 are formed on both end portions of the movable contact point plate support portion 43 in a longitudinal direction (refer to FIG. 1 and FIG. 6).

The movable contact point plate 50 comprises abase portion 51 having the same length with that of the movable contact point plate support portion 43 in the longitudinal direction, and two leg portions 52 that extend from both ends of the base portion 51, and is molded from an elastic metal a basic shape of which is a reverse C-letter shape. Further, plural tongue pieces 53 (herein three tongue pieces), each of which has a smaller size as compared to that of the leg portion 52, extend in parallel from between the two leg portions 52 of the base portion 51.

The tongue piece 53 is bent in a downward oblique side from the root, and the movable contact point plate 50 is mounted to the base 41 in such a manner that the tongue piece 53 is oriented outward.

The leg portion 52 has an outer side that is perpendicular to the longitudinal direction of the base portion 51, a root in a side of the base portion 51 that is wide in width, and a tip end that is narrow in width.

The leg portion 52 is set to be folded back to a side of the disc portion 42 at the root, and extend the outer side in an upward oblique side above the base portion 51 while holding the outer side to be perpendicular to the longitudinal direction of the base portion 51, and is provided with a movable contact point 55 in a tip end on a side of an upper surface thereof.

It should be noted that the base portion 51, for exposing the above-outer peripheral upper surface 46 of the disc portion 42, has an intermediate portion that is formed to have a narrow width by cutting away a predetermined range thereof across both sides of the two-parting line from a side of the disc portion 42. An exposure section of the outer peripheral upper surface 46 of the disc portion 42 is configured as a contact portion with the moving block 60.

Round holes 56 are provided in both end portions of the base portion 51 to correspond to the round projections 47 of the movable contact point plate support portion 43, and the round hole 56 is pressed into the round projection 47 to position the movable contact point 50 to the base 41.

A pressing member 57 is mounted on an intermediate part of the movable contact point plate support portion 43. The pressing member 57 comprises a mounting base portion 58, and arm portions 59 that extend from the mounting base portion 58 to both sides of the movable contact point plate support portion 43 in the longitudinal direction, and after being offset to a position higher than the folding-back portion of the leg portion 52 of the movable contact point plate 50, extend in parallel with each other to a side of the disc portion 42 and in parallel with the upper surface of the base 41.

The base 41, the movable contact point plate 50 and the pressing member 57 are united by rivets 48 through rivet holes (not shown) that are formed respectively in the movable contact point plate support portion 43, the base portion 51 and the mounting base portion 58, and are aligned with each other.

A tip end of the arm portion 59 extends to a position short of a straight line that passes through the center of the disc portion 42 and is in parallel with the longitudinal direction of the movable contact point plate support portion 43, and presses the leg portion 52 extending in the oblique upward side from the folding-back portion of the movable contact point plate 50, thus holding the leg portion 52 to a posture to be nearly in parallel with the upper surface of the disc portion 42. In this state, the tip end of the arm portion 59 makes contact with a section of the leg portion 52 in a position short of the movable contact point 55.

Figure 4A:
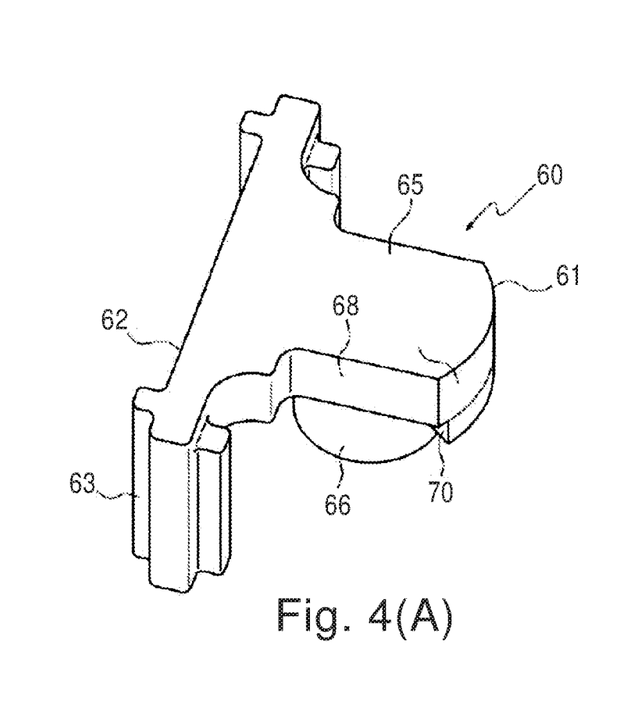
FIGS. 4A and 4B are perspective views each showing a moving block according to the embodiment.
Figure 4B:
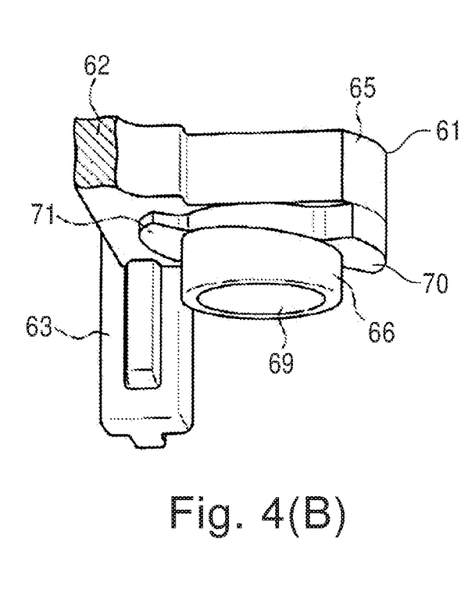

FIGS. 4A and 4B show the moving block 60, wherein FIG. 4A is a perspective view from above, and FIG. 4B is a perspective view from down.

The moving block 60 is made of resin or metal, and comprises a contact point board cooperative portion 61 contactable with the movable contact point board 40, and a guide portion 62 connected to the contact point board cooperative portion 61.

The guide portion 62 has a length equivalent to that of the movable contact point plate support portion 43, and guide rails 63 are provided at both ends of the guide portion 62 to extend downward in parallel with the axis line S for guiding the moving block 60 without a gap in the upper-lower direction. The contact point board cooperative portion 61 is formed to extend from an intermediate position of the guide portion 62.

The contact point board cooperative portion 61 comprises a block base 65 having the same thickness as an intermediate portion of the guide 62 interposed between the rails 63, and a projecting shaft portion 66 extending downward from the block base 65. A tip end portion of the block base 65 at a distance from the guide portion 62 forms a cylindrical surface 67 of an outer diameter overlapping the outer peripheral upper surface 46 of the disc portion 42 around the axis center S, and side walls thereof connecting to the guide portion 62 are cut down on a perpendicular surface to the guide portion 62 to be formed as plane portions 68 each having a shape of a width across flats. This cutting-down of the side wall is performed to ensure a passing space of the stopper 20 of the first case 11.

The upper surface of the contact point board cooperative portion 61 (block base 65) is flush with the upper surface of the guide portion 62, which is configured as a smooth plane perpendicular to the axis line S.

The projecting shaft portion 66 has a diameter equivalent to a distance (width across flats) between the plane portions 68 of the block base 65, and this diameter is slightly smaller than the through hole 44 of the movable contact point board 40. A concave portion is opened to a lower end surface of the projecting shaft portion 66 to be a spring receiver 69 (refer to FIG. 6) for receiving the upper end of the first coil spring 7.

An upper portion of the projecting shaft portion 66 connecting to the block base 65 is provided with protruding portions 70 and 71 respectively in sides away from and near the guide portion 62.

The protruding portion 70 in the side away from the guide portion 62 is flush with the cylindrical surface 67 of the block base 65, has the same outer diameter as that of the cylindrical surface 67, and has substantially the same length as that of the cylindrical surface 67 in the circumferential direction.

The protruding portion 71 in the side near the guide portion 62 is positioned to be symmetrical to the protruding portion 70 in the side away from the guide portion 62 around the axis center S, and is formed to be swollen from the lower surface of the block base 65 with the same outer diameter and the same circumferential length as the protruding portion 70 in the side away therefrom.

Here, lower end surfaces of both the protruding portions 70 and 71 are set as a single common surface (inclined surface) that is inclined to be high in a side of the guide portion 62 and lower as be away from the guide portion 62.

It should be noted that a peripheral wall of the projecting shaft portion 66 between the protruding portions 70 and 71 is slightly cut way to have a smaller diameter.

Figure 5:
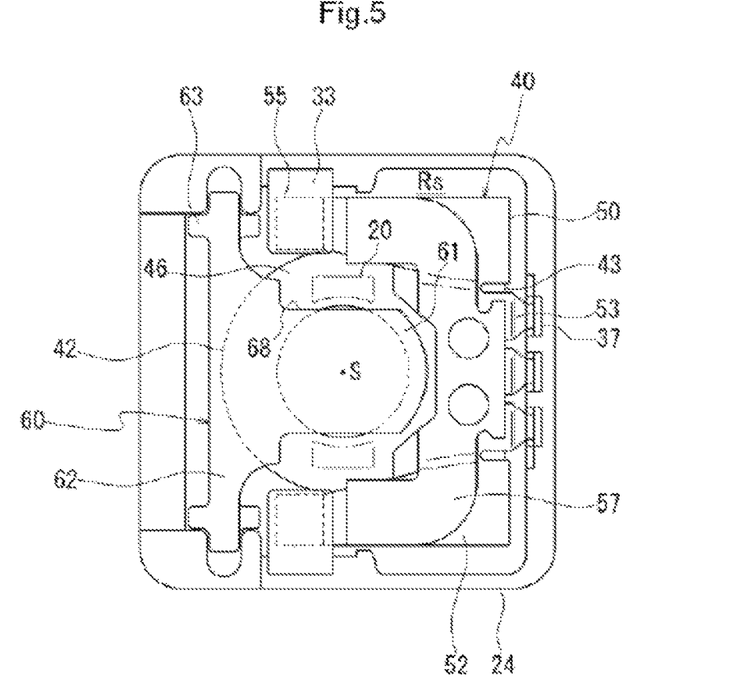
FIG. 5 is a diagram showing an arrangement of members within a contact point accommodating chamber as viewed in an axial direction according to the embodiment.

FIG. 5 is a diagram showing a state where the stoppers 20 of the first case 11 overlap on a diagram showing the movable contact point board 40 and the moving block 60 arranged within the contact point accommodating chamber Rs as viewed in the axial direction.

The movable contact point plate support plate 43 in the base of the movable contact point board 40 and the guide portion 62 of the moving block 60 are arranged to oppose around the axis center S in the contact point accommodating chamber Rs of the casing 2, and the moving block 60 can move upward and downward in parallel with the axis line S with a sliding movement of the rails 63 along guide grooves formed in the contact point accommodating chamber Rs.

The stopper 20 passes through a space along the plane portion 68 of the moving block 60 to oppose the outer peripheral upper surface 46 of the disc portion 42 in the movable contact point board 40.

As described above, the projection 5 of the push rod 2 makes contact with the upper surface of the moving block 60 (refer to FIG. 1).

Figure 6:
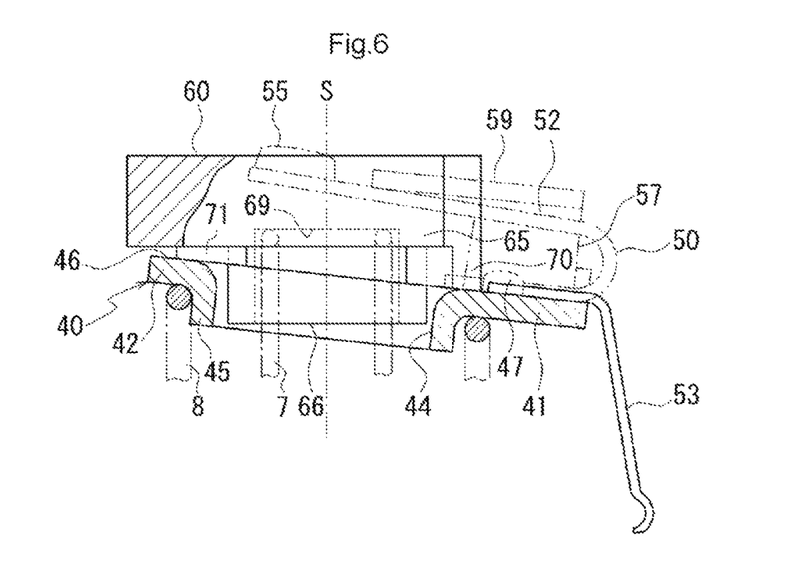
FIG. 6 is a cross section showing a contact state of the moving block and the movable contact point board in an initial state according to the embodiment.

In an initial state, the moving block 60 is pressed by the push rod 2, and the movable contact point board 40 is urged upward by the second coil spring 8. Therefore as shown in FIG. 6, the tip end of the projecting shaft portion 66 of the moving block 60 enters into the through hole 44 of the disc portion 42 in the movable contact point board 40 and, on the other hand, the outer peripheral upper surface 46 of the disc portion 42 makes contact with the protruding portions 70 and 71 of the projecting shaft portion 66. Since the lower end surface of the protruding portions 70 and 71 is inclined, the movable contact point board 40 is in a state inclined to the moving block 60, and as a result is in a state inclined to the axis line S also.

Figure 7:
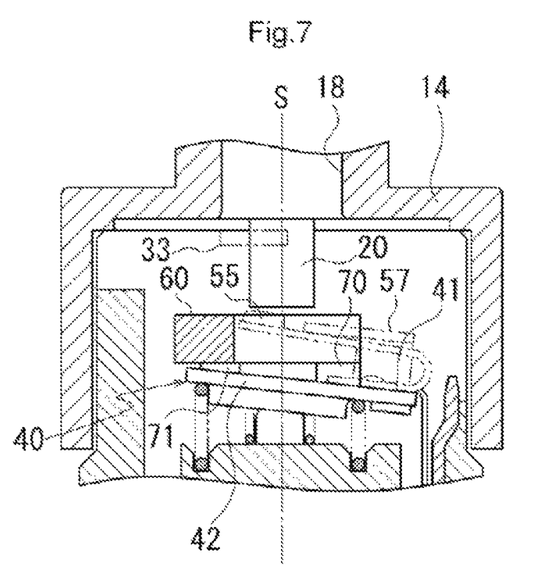
FIG. 7 is diagram showing a relation between a movable contact point board base and a stopper according to the embodiment.

FIG. 7 shows a relation between the movable contact point board 40, particularly the base 41 and the stopper 20. For descriptive purposes, an outline of the base 41 is shown by a solid line, and the movable contact point plate 50 and the pressing member 57 are shown by a virtual line. An upper section in the FIG. 8 is shown in the same way.

In an initial state, the disc portion 42 of the base 41 is separated from the stoppers 20.

A lower end edge of the stopper 20 opposing the disc portion 42 is set to be perpendicular to the axis line S.

It should be noted that in FIG. 1, in regard to the moving block 60 and the movable contact point board 40, a cross section passing through the axis line S is shown in the left half part from the axis line S, and a cross section passing through the leg portion 52 of the movable contact point plate 50 is shown in the right half part from the axis line S. A lower section in each of FIGS. 8A to 8C to be illustrated later is also shown in the same way.

As shown in FIG. 1, the tongue piece 53 of the movable contact point board 40 electrically connects the movable contact point 55 to the connector terminal 36 by contact of the tip end with the lower parallel portion 37*a* of the tongue piece contact portion 37 of the power supply plate 35. The tongue piece 53 all the time makes contact with the tongue piece contact portion 37 during the transfer of the movable contact point board 40 to hold this electrical connection.

In the initial state, the movable contact point 55 of the movable contact point board 40 in a lower position is separated from the fixed contact point 33 positioned in an upper end in the contact point accommodating chamber Rs.

In addition, since a seating surface of the upper end of the second coil spring 8 is inclined by inclination of the movable contact point board 40, an urging force of the second coil spring 8 includes a component of rotating the movable contact point board 40.

Next, an operation of the push switch 1 as configured above will be explained.

First, in the initial state in FIG. 1, the push rod 2 is pressed down and therefore the tip end of the operation portion 3 is flush with the tip end of the cylindrical portion 13, but is urged in the projecting direction from the cylindrical portion 13 through the moving block 60 and further, the movable contact point board 40 by the first coil spring 7 and the second coil spring 8. Accordingly, when the member in a side of the brake pedal pressing the push rod 2 is displaced in a direction in reverse to the pressing direction by depressing the brake pedal, the tip end (upper end) of the operation portion 3 projects from the tip end of the cylindrical portion 13 of the casing 2 following this displacement, and the projection 5 of the collar portion 4 is retreated upward.

As shown in FIG. 6, the movable contact point board 40, in the inclined state where the disc portion 42 is caused to make contact with the protruding portions 70 and 71 of the projecting shaft portion 66 by the urging force of the second coil spring 8, moves upward together with the moving block 60 with pressing the upper surface of the moving block 60 on the projection 5. The urging force of the first coil spring 7 is added to the force of pressing the upper surface of the moving block 60 on the projection 5.

Figure 8A:
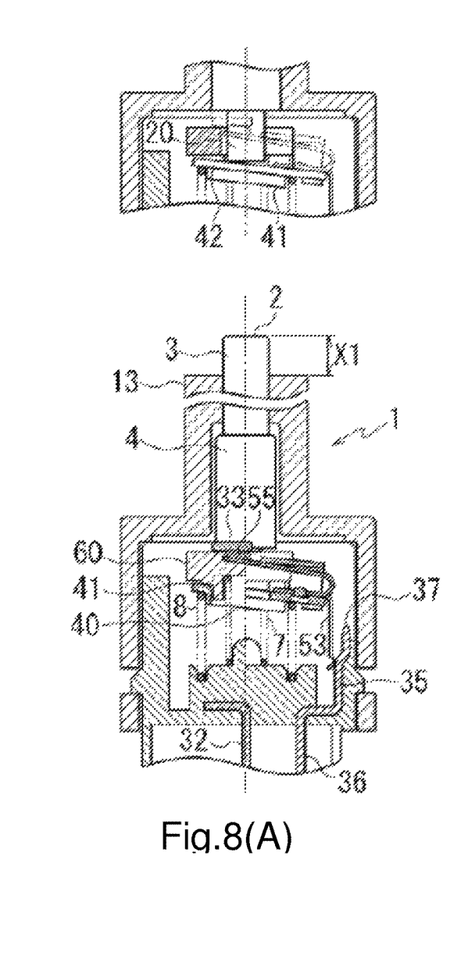
FIGS. 8A, 8B and 8C are explanatory diagrams showing an operation of the push switch according to the embodiment.

FIG. 8A shows a state of timing where the operation portion 3 of the push rod 2 projects by a length of X1 from the cylindrical portion 13, and the movable contact point board 40 and the moving block 60 rise following it to make the movable contact point 55 of the movable contact point board 40 in contact with the fixed contact point 33.

Figure 8B:
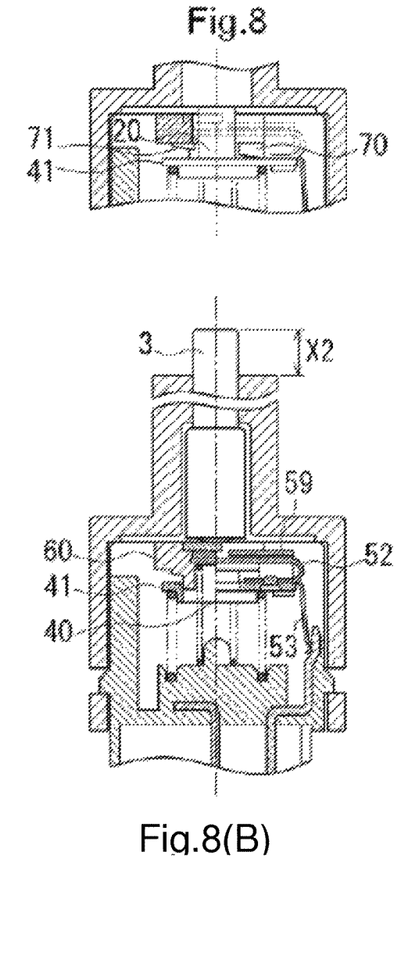
Figure 8C:
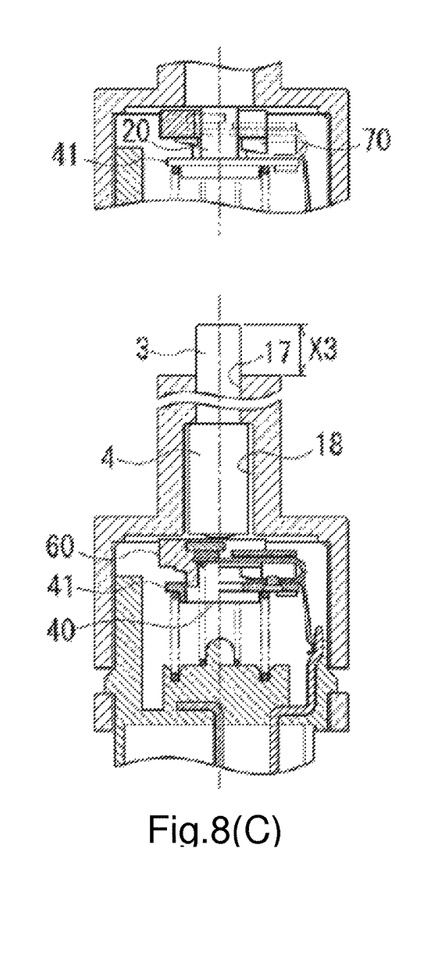

It should be noted that an upper section in each of FIGS. 8A to 8C shows a relation between the base 41 and the stopper 20 as similar to FIG. 7, and a lower section thereof shows the movement of the movable contact point board 40 and the moving block 60.

With contact between the movable contact point 55 and the fixed contact point 33, the power supply between the connector terminals 36 and 32 starts through the tongue piece contact portion 37, the tongue piece 53, the movable contact point 55 and the fixed contact point 33 to switch on the push switch 1.

The movable contact point board 40 is still in the inclined state. The tongue piece 53 slides on the tongue piece contact portion 37 of the power supply plate 35, and the tip end moves to a transfer point from the lower parallel portion 37a to the inclined portion 37b (refer to FIG. 1).

In addition, the stopper 20 has a predetermined length that is set in such a manner that a corner of the tip end makes contact with the outer peripheral upper surface 46 of the base 41 (disc portion 42) of the movable contact point board 40. The section which the stopper 20 makes contact with is an intermediate section along the outer periphery of the base 41 between the sections which both the protruding portions 70 and 71 of the moving block 60 make contact with.

The leg portion 52 of the movable contact point plate 50 supporting the movable contact point 55 is to be separated from the arm portion 59 of the pressing member 57.

When the push rod 2 further projects and a projecting length of the operation portion becomes X2, the moving block 60 rises by the first coil spring 7 following the push rod 2.

In addition, as shown in FIG. 8B, in a state where the section of the base 21 having made contact with the corner of the stopper 20 remains to be stopped by the stopper 20, according to the rising of the moving block 60, the movable contact point board 40 rotates such that a side of the base 41 (disc portion 42), which is pressed down by the protruding portion 70 a lower end surface of which is low, rises by the urging force of the second coil spring 8, particularly a force component of rotating the movable contact point board 40. FIG. 8B shows a state where the movable contact point board 40 rotates until the base 41 of the movable contact point board 40 becomes perpendicular to the axis line S to make contact with an entire edge of the lower end of the stopper 20.

At this moment, since the tip end of the tongue piece 53 extending from the movable contact point board 40 slides outward on the inclined portion 37b of the tongue piece contact portion 37, the protruding of the tongue piece 53 is configured not to affect rotation of the movable contact point board 40.

The movable contact point 55 in contact with the fixed contact point 33 slides and is displaced to the fixed contact point 33 with this rotation. This displacement amount is larger than a displacement amount generated only by a simple deflection of the spring member after the movable contact point provided in the spring member makes contact with the fixed contact point in the conventional switch.

Further, since the leg portion 52 of the movable contact point plate 50 has a predetermine reaction caused by an initial deflection in advance provided by the arm portion 59, a high contact pressure is generated between the movable contact point 55 and the fixed contact point 33, which starts with an initial pressure corresponding to the above reaction at the same time with contact between the movable contact point 55 and the fixed contact point 33.

As described above, the excellent wiping operation is performed between both the contact points 33 and 55 due to the event that the movable contact point 55 and the fixed contact point 33 largely slides and are displaced relative to each other while being in contact with each other, and the event that the contact pressure between the movable contact point 55 and the fixed contact point 33 is high. Therefore foreign objects such as carbides that can be generated between the contact surfaces of both the contact points can be effectively eliminated. In addition, since the contact pressure at the contacting time between the movable contact point 55 and the fixed contact point 33 is high, it is possible to restrict generation of the arc without the wobbly movement at the contacting time of the contact points.

FIG. 8C shows a state where the push rod 2 rises until the collar portion 4 makes contact with the step portion between the first hole 17 and the second hole 18 to cause the projecting length of the operation portion 3 from the cylindrical portion 13 to become X3.

Since the moving block 60 is urged by the first coil spring 7, the moving block 60 rises in a state of being pressed on the push rod 2, and as shown in the upper section in the figure, the protruding portion 70 is separated from the base 41. On the other hand, it is restricted for the movable contact point board 40 to rise after the base 41 makes contact with the stopper 20 to become perpendicular to the axis line S.

That is, the protruding portion 70 of the moving block 60 is only separated from the movable contact point board 40, and the contact state between the movable contact point 55 of the movable contact point board 40 and the fixed contact point 33 in a side of the casing 10 is held in the same state with the state in FIG. 8B.

It should be noted that in FIG. 8A, it is not necessary for the timing when the base 41 makes contact with the stopper 20 to be defined exactly based upon the position at a moment when the movable contact point 55 makes contact with the fixed contact point 33, and the timing may be set such that the base 41 makes contact with the stopper 20 in a position within a predetermined range including the above moment position.

When the base 41 makes contact with the stopper 20 before the moment the movable contact point 55 makes contact with the fixed contact point 33, the movable contact point board 40 rotates first. Therefore the movable contact point 55 makes contact with the fixed contact point 33 in the displacement midway in the sliding direction, and the sliding distance after the contacting become relatively short. On the other hand, when the base 41 makes contact with the stopper 20 after the moment the movable contact point 55 makes contact with the fixed contact point 33, the sliding of the movable contact point board 40 starts after the contacting. Therefore when the retreat distance of the moving block 60 is short, the sliding distance becomes relatively short. Accordingly, in consideration with these relations, the predetermined range may be set in such a manner as to be able to obtain a desired sliding distance.

When the push rod 2 is pressed down by brake release, the above-mentioned process advances in the reverse direction, and the large wiping operation is performed between the movable contact point 55 and the fixed contact point 33 at the time the push rod 2 returns back from a state of FIG. 8B to a state of FIG. 8A. When the movable contact point 55 is separated from the fixed contact point 33 after passing the state of FIG. 8A, the push switch 1 switches off, and finally the push rod 2 returns back to the initial state of FIG. 1.

In the present embodiment, the second spring 8 corresponds to an urging unit in the present invention, and the inclined lower end surface of the protruding portions 70 and 71 in the moving block 60 corresponds to an inclining unit.

In addition, the end edge of the stopper 20 that makes contact with the opposing surface of the movable contact point board 40 to the moving block 60 and extends to be perpendicular to the axis line S also configures a posture changing unit.

The push switch in the present embodiment is configured as described above, and includes the movable contact point board 40 that is provided with the movable contact point 55 and moves along the axis line S of the push rod 2, the moving block 60 that moves on the axis line S to be contactable with the movable contact point board 40, the second coil spring 8 that urges the movable contact point board 40 and the moving block 60 in a direction of making contact with each other, and the stopper 20 that prevents the stroke movement of the movable contact point board 40 in a predetermined position where the movable contact point board 40 makes contact with the fixed contact point 33. The moving block 60 is provided with the protruding portions 70 and 71 having the inclined surface on the opposing portion in such a manner as to hold the movable contact point board 40 in the inclined state to the axis line S in the contact state with the movable contact point board 40, and the end edge of the stopper 20 that makes contact with the movable contact point board 40 extends to be perpendicular to the axis line S, so that after the stroke movement is stopped by the stopper 20, the movable contact point board 40 changes in posture in a direction perpendicular to the axis line S from the inclined state corresponding to the separation due to the stroke movement of the moving block 60 after the stroke movement is stopped by the stopper 20. Therefore the mutual sliding displacement is particularly large during a period where the fixed contact point 33 makes contact with the movable contact point 55, and an excellent wiping operation can be obtained.

In this moment, the posture change of the movable contact point board 40 from the inclined state after the stroke movement is stopped is caused only by the event that the movable contact point board 40 moves in the extending direction of the end edge of the stopper 20. Therefore a different additional member is not required.

In addition, since the push rod 2 is caused to make contact with the moving block 60 and the moving block 60 is pressed to the push rod 2 by the first spring 7, the push rod 2 is operated in a telescopic (projecting and pressing from the casing) direction, thereby making it possible to move the movable contact point 40 and the moving block 60 following this.

Particularly the push rod 2, the moving block 60 and the movable contact point board 40 line up in that order in the axis line S direction, and the first spring 7 and the second spring 8 urge the moving block 60 and the movable contact point board 40 in the same direction. Therefore the push rod is pressed to separate the fixed contact point 33 from the movable contact point 55 in a compression state of the first spring 7, thus achieving a push switch of a type that the push rod is projected by a pressing release preferable in a vehicular brake switch to switch on the push switch.

The movable contact points 55, the fixed contact points 33 and the stoppers 20 are respectively arranged at both sides around the axis line S. Therefore the high reliability by multiplexing, and the uniform, stable contact and wiping operation even between plural contact points 33 and movable contact points 55 can be ensured constantly.

The movable contact point board 40 includes the base 41 having the contact surface with the moving block 60, and the movable contact point plate 50 made of elastic metal that is mounted to the base 41 and extends in a direction corresponding to the fixed contact point 33, wherein the movable contact point 55 is provided in the movable contact point plate 50. Therefore the contact pressure can be provided between the fixed contact point 33 and the movable contact point 55 by elasticity of the movable contact point plate 50.

Particularly since the movable contact point board 40 further includes the pressing member 57 to provide the initial deflection to the movable contact point 50 (leg portion 52), the high contact pressure that starts with the initial pressure is generated between the fixed contact point 33 and the movable contact point 55 based upon the initial deflection at the same time with the contact. Thus the excellent wiping operation is performed between both the contact points. In addition, the wobble of the movable contact point 55 is not generated at the contact time of both the contact points 33 and 55, making it possible to restrict generation of the arc.

It should be noted that in the present embodiment, the stoppers 20 make contact with the intermediate positions between the sections of the disc portion 42 in the base 41 making contact with the protruding portions 70 and 71 along the outer periphery of the disc portion 42, and for realizing the posture change (rotation) of the movable contact point board 40 after the movable contact point 55 makes contact with the fixed contact point 33, the base 41 is configured to follow the end edges of the stoppers 20. However, the posture changing unit is not limited thereto.

For example, the stopper may be divided into a first stopper and a second stopper across the axis center such that the first stopper makes contact with an end portion of the base 41 in a side of the section making contact with the protruding portion 70 and the second stopper makes contact with an end portion of the base 41 in a side of the section making contact with the protruding portion 71.

Further, also in regard to the protruding portions 70 and 71 as the inclining unit, elements similar thereto may be provided in the movable contact point 40-side, not in the moving block.

Further, also in regard to the angle of the posture change, the end edge of the stopper extends to be perpendicular to the axis line S to set the movable contact point board 40 to the perpendicular posture, but if a desired sliding displacement can be obtained, the movable contact point board is not limited to be perpendicular to the axis line S but may be only required to have an angle different from the inclined angle of the movable contact point 40 by the inclining unit.

In the present embodiment, the push switch of a type that switches on by projecting the push rod 2 is explained, but the present invention is not limited thereto, and may be applied to a push switch of a type that switches on by pressing down the push rod 2.

In this case, the arrangement of the moving block, the movable contact point board and the second coil spring is reversed in the upper-lower direction to that in FIG. 1, but the first coil spring may be provided in the same arrangement with present embodiment to urge the moving block upward. It should be noted that the push rod may make contact with the moving block through the through hole of the movable contact point board (base).

It should be noted that the present embodiment is explained as the example in which the push switch is applied to the brake pedal, but the present invention is not limited thereto, and may be applied to switches in various kinds of fields.

In addition, the present embodiment is provided with the push rod 2 making contact with the moving block 60 as the operation member for operating the push switch, but an operation portion projecting from a casing is formed in a moving block itself, thus making it possible to eliminate the push rod.

In addition, a shape, a size and the like of each member are not limited to those illustrated, but may be arbitrarily set within a range where the operational effect of the present invention can be achieved, corresponding to the installation place, the use aspect or the like.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

DESCRIPTION OF CODES

1 Push switch
2 Push rod
3 Operation portion
4 Collar portion
5 Projection portion
7 First coil spring
8 Second coil spring
10 Casing
11 First case
12 Fitting portion
13 Cylindrical portion
14 Upper wall
15a, 15b Side wall
16 Engagement hole
17 First hole
18 Second hole
20 Stopper
21 Step portion
24 Second case
25a, 25b, 25c Side wall
26 Bottom wall
27 Spring receiver
28 Spring receiver
29 Concave portion
30 Click
31 Fixed contact point plate
32, 36 Connector terminal
33 Fixed contact point
35 Power supply plate
37 Tongue piece contact portion
37a Lower parallel portion
37b Inclined portion
37c Upper parallel portion
40 Movable contact point board
41 Base
42 Disc portion
43 Movable contact point plate support portion
44 Through hole
45 Cylindrical portion
46 Outer peripheral upper surface
47 Round projection
48 Rivet
50 Movable contact point plate
51 Base portion
52 Leg portion
53 Tongue piece
55 Movable contact point
56 Round hole
57 Pressing member
58 Mounting base portion
59 Arm portion
60 Moving block
61 Contact point board cooperative portion
62 Guide portion
63 Rail
65 Block base
66 Projecting shaft portion
67 Cylindrical surface
68 Plane portion
69 Spring receiver
70, 71 Protruding portion
Rs Contact point accommodating chamber
Rr Reception concave portion

What is claimed is:

1. A push switch in which a movable contact point moves in a predetermined axis line direction to make contact with a fixed contact point, comprising:
   a moving contact point board that is provided with the movable contact point and moves along the axis line;
   a moving block that moves on the axis line to be contactable with the movable contact point board;
   an urging unit configured to urge the movable contact point board and the moving block in a direction of being in contact with each other;
   a stopper for stopping the movement of the movable contact point board in a predetermined position where the movable contact point makes contact with the fixed contact point;
   an inclining unit that is provided in at least one of the movable contact point board and the moving block to hold the movable contact point board in an inclined state to the axis line in a contacting point of each other;
   a posture changing unit configured to change a posture of the movable contact point board from the inclined state corresponding to the separation by the movement of the moving block after the stroke movement is stopped by the stopper;
   a push rod that is movable to a fixed side to make contact with the moving block; and
   a first spring that presses the moving block on the push rod, wherein the movable contact point in contact with the fixed contact point slides and is displaced to the fixed contact point during the posture change of the movable contact point board.

2. A push switch according to claim 1, wherein the urging unit includes a second spring that is provided between the movable contact point board and a fixed side to press the movable contact point board on the moving block.

3. A push switch according to claim 2, wherein the push rod, the moving block and the movable contact point board line up in that order in an axis line direction, and the first spring and the second spring urge the moving block and the movable contact point board in the same direction.

4. A push switch according to claim 1, wherein the inclining unit includes an inclined surface provided on an opposing portion of the moving block to the movable contact point board.

5. A push switch according to claim 1, wherein the posture changing unit includes an end edge of the stopper that makes contact with an opposing surface of the movable contact point board to the moving block and extends at an angle different from the inclination by the inclining unit.

6. A push switch according to claim 1, wherein the movable contact point, the fixed contact point and the stopper are respectively arranged at both sides around the axis line.

7. A push switch according to claim 1, wherein the movable contact point board includes a base having a contact surface with the moving block, and a movable contact point plate made of elastic metal that is mounted on the base and extends in a direction corresponding to the fixed contact point, wherein the movable contact point is provided in the movable contact point plate.

8. A push switch according to claim 7, wherein the movable contact point board further includes a pressing member to provide an initial deflection to the movable contact point plate.

9. A push switch in which a movable contact point moves in a predetermined axis line direction to make contact with a fixed contact point, comprising:
a moving contact point board that is provided with the movable contact point and moves along the axis line;
a moving block that moves on the axis line to be contactable with the movable contact point board;
an urging unit configured to urge the movable contact point board and the moving block in a direction of being in contact with each other;
a stopper for stopping the movement of the movable contact point board in a predetermined position where the movable contact point makes contact with the fixed contact point;
an inclining unit that is provided in at least one of the movable contact point board and the moving block to hold the movable contact point board in an inclined state to the axis line in a contacting point of each other;
a posture changing unit configured to change a posture of the movable contact point board from the inclined state corresponding to the separation by the movement of the moving block after the stroke movement is stopped by the stopper;
a push rod that is movable to a fixed side to make contact with the moving block; and
a first spring that presses the moving block on the push rod.

10. A push switch in which a movable contact point moves in a predetermined axis line direction to make contact with a fixed contact point, comprising:
a moving contact point board that is provided with the movable contact point and moves along the axis line;
a moving block that moves on the axis line to be contactable with the movable contact point board;
an urging unit configured to urge the movable contact point board and the moving block in a direction of being in contact with each other;
a stopper for stopping the movement of the movable contact point board in a predetermined position where the movable contact point makes contact with the fixed contact point;
an inclining unit that is provided in at least one of the movable contact point board and the moving block to hold the movable contact point board in an inclined state to the axis line in a contacting point of each other; and
a posture changing unit configured to change a posture of the movable contact point board from the inclined state corresponding to the separation by the movement of the moving block after the stroke movement is stopped by the stopper;
wherein the movable contact point, the fixed contact point and the stopper are respectively arranged at both sides around the axis line.

\* \* \* \* \*